W. B. & G. M. RAMSAY.
Harrow.
No. 10,865. Patented May 2, 1854.
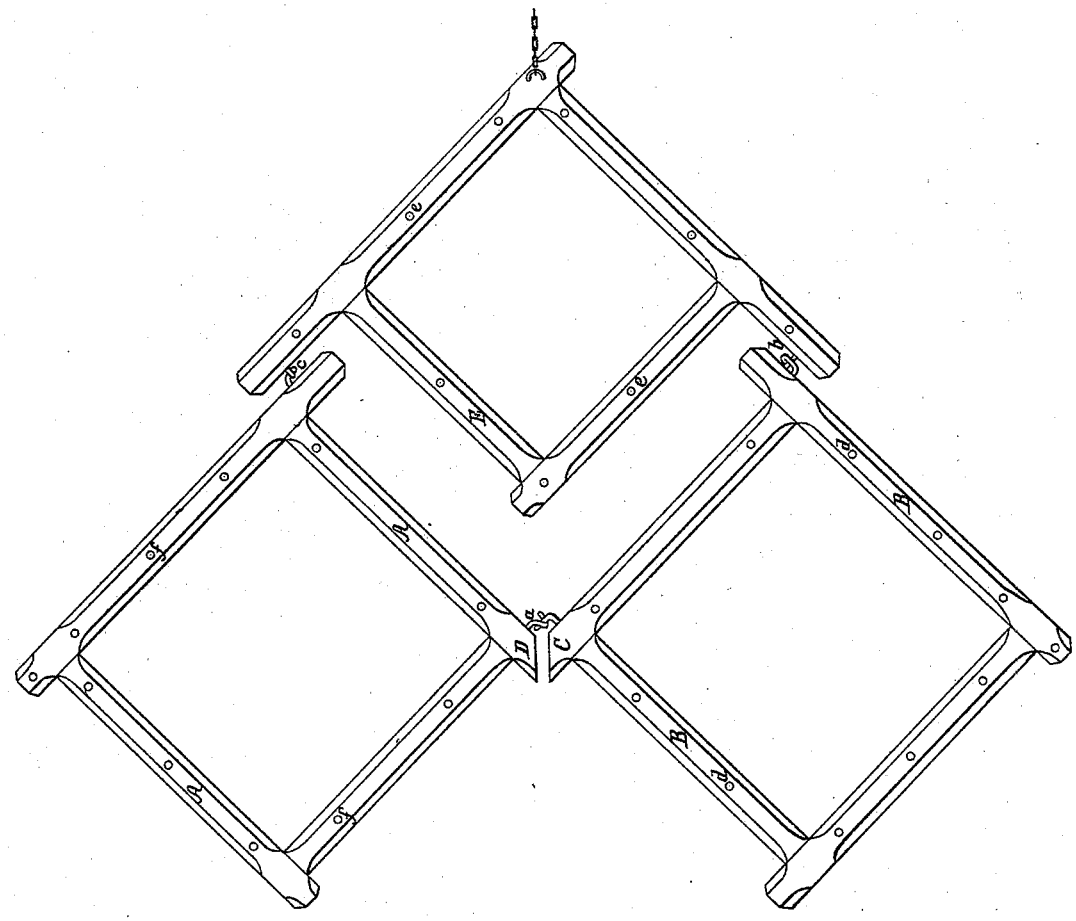

UNITED STATES PATENT OFFICE.

W. B. RAMSAY AND G. M. RAMSAY, OF SOUTH STRABANE, PENNSYLVANIA.

IMPROVEMENT IN FLEXIBLE HARROWS.

Specification forming part of Letters Patent No. 10,865, dated May 2, 1854.

*To all whom it may concern:*

Be it known that we, W. B. RAMSAY and G. M. RAMSAY, of South Strabane, in the county of Washington and State of Pennsylvania, have invented a new and useful Improvement in Flexible Harrows; and we do hereby declare that the following is a full, clear, and exact description of the same, reference being had to the accompanying drawing, forming a part of this specification, which represents a plan or bird's-eye view of the harrow constructed and arranged after our plan.

The nature of our invention consists in constructing a flexible harrow of three separate parts or squares and making said squares of such proportions and arranging them in such relation to each other that one of their diagonal lines will run parallel to the line of travel and the other transverse thereto, whereby we are enabled to obtain a greater breadth of sweep than is secured with a harrow composed of four parts and arranged and jointed together in the ordinary way, and also to connect the whole together by three hinges or flexible joints arranged in the position of a right-angle triangle, by which position we secure a greater freedom and diversity of motion than can be obtained by any other position of the same number of flexible joints or hinges.

To enable others skilled in the art to make and use our invention, we will proceed to describe its construction and operation.

A B represent the two hind parts or squares. These are arranged as shown in the drawing, their ends C D being cut to angles of forty-five degrees and placed opposite each other, and are connected together by a flexible hinge, *a*, and made to resemble a loose miter-joint. By thus placing the squares we obtain a much broader sweep than has ever been secured by the harrows composed of four parts of similar size. Thus expense of one part in constructing the harrow is saved.

E represents the front part. This is shaped so as to fit the other parts, A B, as seen in the drawing, and is connected by two of its ends to the hind parts, A B, by flexible hinges or joints *b c*, as seen in the drawing. The joints *a b c* are placed in the position to form a right-angle triangle, and are so shaped that they allow of any movement to the harrow. By thus placing the hinges or joints a great number of movements are secured which are not obtained by the harrows in use, and therefore our harrows possess another advantage beside that of cheapness—viz., that of tilling more perfectly than heretofore irregular and uneven-surfaced lands, and especially when harrowing ridges longitudinally, the front section may ride upon a high furrow and tear it down, while the other two sections fit over the ridge and harrow both sides of it.

The teeth *d e f* may be placed in the harrow, as seen in the drawing.

What we claim as our invention, and desire to secure by Letters Patent, is—

The peculiar arrangement, herein described and shown in the drawing, of the three parts of the harrow and the three flexuous joints connecting the same together, in combination with the construction of said joints, which allows of the several parts very freely and perfectly adjusting themselves up and down independent of each other in passing over the undulating surface of the soil, substantially as and for the purpose herein described. By thus arranging and combining the several parts of the harrow we are enabled to simplify its construction, lessen its cost, and render it capable of making ten more movements than any other flexible harrow known, and consequently performing the harrowing operation more perfectly and speedily, as set forth.

WM. B. RAMSAY.
GEO. M. RAMSAY.

Witnesses as to signature of W. B. Ramsay:
   PETER KENNEDY,
   J. L. JUDSON.

Witnesses as to signature of Geo. M. Ramsay:
   O. D. MUNN,
   E. C. POLHAMUS.